US006187193B1

(12) United States Patent
Ozama (10) Patent No.: US 6,187,193 B1
(45) Date of Patent: Feb. 13, 2001

(54) GREASE TRAP AND METHOD OF DECOMPOSING EDIBLE OILS AND FATS IN THE GREASE TRAP

(75) Inventor: Hideya Ozama, Ibaragi (JP)

(73) Assignees: Kikunori Tsukasako; Kabushiki, Kaisha, Eiburu, Kurieichon, both of Hiroshima (JP)

(*) Notice: Under 35 U.S.C. 154(b), the term of this patent shall be extended for 0 days.

(21) Appl. No.: 09/264,869

(22) Filed: Mar. 9, 1999

(30) Foreign Application Priority Data

Mar. 13, 1998 (JP) .................................................. 10-105285

(51) Int. Cl.$^7$ ....................................................... C02F 1/40
(52) U.S. Cl. .......................... 210/608; 210/629; 210/194; 210/197; 210/538
(58) Field of Search ..................................... 210/194, 197, 210/167, 538, 540, 608, 610, 620, 629; 261/155

(56) References Cited

U.S. PATENT DOCUMENTS

| 1,790,975 | * | 3/1931 | Dallas et al. ........................... 210/194 |
| 2,054,395 | * | 9/1936 | Streander .............................. 210/194 |
| 2,172,646 | * | 9/1939 | Walker ................................... 210/197 |
| 3,219,189 | * | 11/1965 | Moore ................................... 210/197 |
| 3,957,633 | * | 5/1976 | Gatti et al. ............................ 210/194 |
| 3,957,642 | * | 5/1976 | Oldham et al. ....................... 210/194 |
| 3,966,608 | * | 6/1976 | Mason et al. ......................... 210/197 |
| 4,202,762 | * | 5/1980 | Fontein et al. ....................... 210/197 |
| 4,940,539 | * | 7/1990 | Weber ................................... 210/538 |

* cited by examiner

Primary Examiner—Christopher Upton
(74) Attorney, Agent, or Firm—Arent Fox Kintner Plotkin & Kahn (57) ABSTRACT

The invention provides a grease trap and a method of decomposing edible oils and fats using the grease trap. The grease trap for storing the drainage includes a drain inlet for introducing drainage from a kitchen through a drainpipe and a drain exit for discharging the drainage to a sewer, and accommodates an impeller unit having an impeller which continuously rotates to stir and splash the drainage surface, or a sprinkler unit which continuously sprinkles the drainage onto the drainage surface. The decomposing method comprises the steps of storing the drainage from a kitchen in the grease trap, supplying aerobic microorganisms into the drainage, and continuously stirring and splashing the surface of the drainage using the impeller unit or continuously sprinkling the drainage onto the drainage surface using the sprinkler unit, thereby activating the aerobic microorganisms.

14 Claims, 6 Drawing Sheets

GREASE TRAP AND METHOD OF DECOMPOSING EDIBLE OILS AND FATS IN THE GREASE TRAP

BACKGROUND OF THE INVENTION

The present invention relates to a grease trap and a method of decomposing edible oils and fats in the grease trap. In particular, the present invention relates to a method of decomposing edible oils and fats which are substantially contained in drainage from a restaurant kitchen by activating aerobic microorganisms, and a grease trap equipped with a decomposing unit for decomposing edible oils and fats.

It has been prohibited to discharge drainage from the kitchen of a restaurant into a sewer directly. As a conventional drainage treatment, the drainage from a restaurant kitchen is temporarily held in a grease trap, where oils and fats separate from water and float on the top surface of the drainage. In this grease trap, however, some oils and fats solidify on the drainage surface, some putrefy below the solidified layer and give out putrefying odours, and the others are deposited on a drainpipe to obstruct the flow of the drainage. In order to avoid these problems, the restaurant staff has to remove the oils and fats accumulated in the grease trap everyday or once in a few days. Regrettably, such oils/fats removal operation costs substantial money and labor.

Alternative methods of drainage treatment include an oils/fats dissolution method of dissolving the accumulated oils and fats into water and smoothly discharging the mixture of oils/fats and water, and an oils/fats decomposition method. These methods utilise naturally existing microorganisms and enzymes for their ability to decompose oils and fats or dissolve the same in water. However, the microorganisms are deactivated in such a disappointingly short period that they fail to give expected results and oils and fats clog the drainpipe in the end.

The microorganisms may be referred to as bacteria or germs in some occasions. In a scientific classification, however, it is difficult to identify the species of a microorganism. This is partly because the definition of "microorganism" includes a living organism in which various species of microorganisms coexist in huge population. In addition, enzymes are catalytic substances which gather and activate microorganisms. Accordingly, the term "microorganism" as used in the present specification also includes enzymes. Given the above interpretations, microorganisms can be classified into the following three categories:

(1) Aerobic Microorganisms which are active in the presence of air;
(2) Anaerobic Microorganisms which are active in the rare presence of air, as observed in putrefying decomposition;
(3) Facultative Microorganisms which turn aerobic or anaerobic to adapt to the environment, i.e. Aerobic/Anaerobic Microorganisms or Nonaerobic/Nonanaerobic Microorganisms.

Usually, anaerobic microorganisms are dominant in water, while aerobic microorganisms are dominant on the water surface which has contact with air. In the scope of the present invention, the drainage surface in the grease trap is covered with edible oils and fats substantially contained in the drainage. Therefore, it is theoretically reasonable and effective to activate aerobic microorganisms with the intention of promoting decomposition of oils and fats. In practice, however, oils and fats solidify on the surface of the drainage and float under water to form sludge. Under the circumstances, anaerobic microorganisms (putrefying bacteria) are activated to progress putrefaction, which continues for a long time and causes ammonia-like malodours. In order to improve air circulation and prevent the putrefaction, conventional drainage treatments practise aeration with the use of an underwater pump. The underwater pump forms air bubbles and releases them towards the water surface, where aerobic microorganisms are active in the abundant presence of air. Regrettably, most air bubbles fail to reach the water surface and aerobic microorganisms do not act, as expected, on the oils and fats floating on the surface. Under constant presence of surface oil/fat solids, insufficient air supply weakens the response of undersurface aerobic microorganisms and results in incomplete oils/fats decomposition. Moreover, undersurface aerobic microorganisms may either be extinguished or migrate into a sewer to get more air. In turn, anaerobic microorganisms grow dominant in the grease trap and eventually putrefy the oils and fats. Thus, mere application of an underwater pump is impractical for effective aeration.

As has been described, it is the most important problem in oils/fats decomposition for the drainage treatment to establish a manner of keeping or extending the life and oils/fats decomposition property of aerobic microorganisms.

SUMMARY OF THE INVENTION

It is an object of the present invention to provide a method of decomposing edible oils and fats with the help of aerobic microorganisms and extending their active period, and a grease trap equipped with an edible oils/fats decomposing unit, from the viewpoint of providing the best living environment and the most effective working condition for aerobic microorganisms.

The grease trap of the present invention is a drainage reservoir having a drain inlet for introducing drainage from a kitchen through a drainpipe and a drain exit for discharging the drainage to a sewer. The grease trap accommodates an impeller unit having an impeller which rotates to stir and splash the drainage surface continuously.

This grease trap may be divided into a plurality of sections by at least one grease filter vertically disposed on the bottom of the grease trap in the direction of traversing the flow of the drainage, the grease filter having a property of passing drainage after oils/fats decomposition.

The grease trap may be further divided into a plurality of subsections by at least one barrier vertically disposed on the grease trap in the direction of traversing the flow of the drainage, the barrier having such a height as to allow the drainage to overflow.

The impeller unit comprises a base disposed on the bottom of the grease trap, an underwater motor rested on the base, a vertical rotation shaft extending vertically from the motor and rotating as driven by the motor, and an impeller rotating along with the vertical rotation shaft. Preferably, the impeller is positioned at such a height as to stir and splash the drainage surface continuously. Additionally, the underwater motor may have an extension means for adjusting its height. Further, an umbrella-shaped shield may be set above the impeller unit for the purpose of catching splashed drainage.

It is preferable that the impeller unit is equipped with a reversible motor for reversing the rotation of the impeller.

Incidentally, the electric wiring and electric systems for driving the impeller unit in the grease trap should be subjected to a water-proof treatment.

With respect to relatively small grease traps, the grease trap installed with the impeller unit works well to achieve the object of the present invention. According to this structure, drainage from a restaurant kitchen is stored in the grease trap, where edible oils and fats float on the surface of the drainage. Then, aerobic microorganisms are supplied into the grease trap. While the surface drainage is splashed by the tips of the rotating impeller, air is circulated and directly supplied into the oils/fats-floating surface. Since continuous aeration activates the aerobic microorganisms existent on the drainage surface, they readily consume the edible oils and fats separated from drainage and hence propagate. To be specific, aerobic microorganisms decompose edible oils and fats, which belong to carbohydrates (organic compounds of carbon, hydrogen and oxygen), into carbon, hydrogen, oxygen and the like, with taking in oxygen in the air, and release carbon dioxide ($CO_2$) and water ($H_2O$). Therefore, it is essential in the decomposition process to supply oxygen constantly into the grease trap. In fact, the grease trap of the present invention is not sealed hermetically and allows sufficient air circulation and air supply.

When the grease trap is divided into a plurality of sections by the grease filter, continuous aeration is effected in the first section by the rotation of the impeller. Aerobic microorganisms are activated and propagate in the first section to decompose edible oils and fats. The drainage after oils/fats decomposition passes through the grease filter and exits into the sewer. When one or more barriers are additionally disposed, the drainage after oils/fats decomposition flows over the barriers to be drained into the sewer.

In this impeller unit, oils and fats may be deposited on the impeller to impose uneven load and obstruct its rotation. The reversible motor is advantageous to the prevention of uneven load, because the reversible rotation strips off or at least disperses the oils and fats deposited on the impeller.

Instead of the impeller unit, the grease trap of the present invention may accommodate a sprinkler unit which continuously sprinkles water onto the drainage surface.

The sprinkler unit includes the following variations.

(I) A sprinkler unit comprising an underwater pump disposed in the drainage, a water pipe vertically extending from the underwater pump above the surface of the drainage, and a fountain top disposed at the top end of the drainpipe, the drainage being pumped up through the water pipe by the underwater pump and sprinkled onto the surface of the drainage from the fountain top.

(II) A sprinkler unit comprising a sprinkler and a motor each fixed on a lid which covers the top opening of the grease trap, a water pipe extending from the motor into the drainage as driven by the motor, and an underwater pump disposed at the bottom end of the water pipe, the drainage being pumped up through the water pipe by the underwater pump and sprinkled onto the surface of the drainage from a head of the sprinkler.

(III) A sprinkler unit comprising a sprinkler pipe formed with a plurality of holes and arranged along one side wall of the grease trap in the direction of the flow of the drainage, a water pipe extending approximately from the middle of the sprinkler pipe into the drainage for supplying the drainage to the sprinkler pipe, and an underwater pump disposed at the bottom end of the water pipe, the drainage being pumped up through the water pipe by the underwater pump and sprinkled onto the surface of the drainage from the plurality of holes in the sprinkler pipe.

(IV) A sprinkler unit comprising a pair of sprinkler pipes formed with a plurality of holes and arranged along both side walls of the grease trap in the direction of the flow of the drainage, a water pipe extending approximately from the middle of each sprinkler pipe and being bent in the drainage 90 degrees inwardly of the grease trap before touching the bottom thereof, and an underwater pump disposed at the bottom end of the water pipe, the drainage being pumped up through each water pipe by the underwater pump and sprinkled onto the surface of the drainage from the plurality of holes in the sprinkler pipes.

In the sprinkler unit, the intake of the underwater pump is designed to pump in the upper half of the drainage stored in the grease trap.

Incidentally, the electric wiring and electric systems for driving the sprinkler unit in the grease trap should be subjected to a water-proof treatment.

These sprinkler units exhibit similar effects to the above impeller unit. In other words, aerobic microorganisms are activated by the water pumped up and sprinkled on the drainage surface. The active microorganisms decompose edible oils and fats floating on the drainage surface into carbon, hydrogen, oxygen and the like, while taking in oxygen, and release carbon dioxide ($CO_2$) and water ($H_2O$). Air is replenished from the lid, drain inlet and drain exit of the grease trap, and constantly supplied into the drainage surface by splinkling the drainage.

The decomposition method of the present invention is carried out with the use of the above grease trap and includes following embodiments.

(A) An impeller-aided air-circulation method is a method of decomposing edible oils and fats while oils-or fats-containing drainage from a kitchen is stored in a grease trap, which comprises the steps of supplying aerobic microorganisms capable of decomposing the edible oils and fats into the drainage, and continuously stirring and splashing the surface of the drainage by means of an impeller unit installed in the grease trap and having an impeller which rotates to effect the stirring and splashing, thereby activating the aerobic microorganisms.

The grease trap as used in this process may be divided into a plurality of sections by at least one grease filter vertically disposed on the bottom of the grease trap in the direction of traversing the flow of the drainage, the grease filter having a property of passing drainage after oils and fats decomposition.

The grease trap may be further divided into a plurality of subsections by at least one barrier vertically disposed on the grease trap in the direction of traversing the flow of the drainage, the barrier having such a height as to allow the drainage to overflow.

Moreover, the impeller unit is preferably equipped with a reversible motor for reversing the rotation of the impeller.

Further, the electric wiring and electric systems for driving the impeller unit in the grease trap should be subjected to a water-proof treatment.

(B) Instead of the impeller unit, the decomposition method may utilise a sprinkler unit which continuously sprinkles water on the drainage surface for activation of the aerobic microorganisms. The methods employing the sprinkler unit include the following variations.

(I) A method using a sprinkler unit comprising an underwater pump disposed in the drainage, a water pipe vertically extending from the underwater pump above the surface of the drainage, and a fountain top disposed at the top end of the drainpipe, the drainage being pumped up through the water pipe by the underwater pump and sprinkled onto the surface of the drainage from the fountain top.

(II) A method using a sprinkler unit comprising a sprinkler and a motor each fixed on a lid which covers the top opening of the grease trap, a water pipe extending from the motor into the drainage as driven by the motor, and an underwater pump disposed at the bottom end of the water pipe, the drainage being pumped up through the water pipe by the underwater pump and sprinkled onto the surface of the drainage from a head of the sprinkler.

(III) A method using a sprinkler unit comprising a sprinkler pipe formed with a plurality of holes and arranged along one side wall of the grease trap in the direction of the flow of the drainage, a water pipe extending approximately from the middle of the sprinkler pipe into the drainage for supplying the drainage to the sprinkler pipe, and an underwater pump disposed at the bottom end of the water pipe, the drainage being pumped up through the water pipe by the underwater pump and sprinkled onto the surface of the drainage from the plurality of holes in the sprinkler pipe.

(IV) A method using a sprinkler unit comprising a pair of sprinkler pipes formed with a plurality of holes and arranged along both side walls of the grease trap in the direction of the flow of the drainage, a water pipe extending approximately from the middle of each sprinkler pipe and being bent in the drainage 90 degrees inwardly of the grease trap before touching the bottom thereof, and an underwater pump disposed at the bottom end of the water pipe, the drainage being pumped up through each water pipe by the underwater pump and sprinkled onto the surface of the drainage from the plurality of holes in the sprinkler pipes.

(V) A method using any of the above sprinkler units, wherein the underwater pump has an intake designed to pump in the upper half of the drainage stored in the grease trap.

Incidentally, the electric wiring and electric systems for driving the sprinkler unit in the grease trap should be subjected to a water-proof treatment.

As have been described, the decomposition methods of the present invention are largely classified into two types: (A) the impeller-aided air-circulation method effected by the rotation of the impeller and applicable to relatively small grease traps, and (B) the sprinkler method using an underwater pump. The aeration in the methods of the present invention comprises supplying air directly onto the oils/fats-floating water surface, unlike the conventional manners of underwater air supply. Under the proper environment, aerobic microorganisms are activated to decompose edible oils and fats floating on the drainage surface into carbon, hydrogen, oxygen and the like, while taking in oxygen, and to release carbon dioxide ($CO_2$) and water ($H_2O$). Air is sufficiently replenished from the lid, drain inlet and drain exit of the grease trap.

DETAILED DESCRIPTION OF THE PREFERRED EMBODIMENTS

The method of decomposing edible oils and fats in the grease trap of the present invention is hereinafter described by specific embodiments.

First of all, drainage drained from a kitchen is stored in a grease trap. Aerobic microorganisms capable of decomposing edible oils and fats are suplied into the drainage and activated under continuous stirring and splashing of the surface water by an impeller unit having an impeller.

The grease trap may be divided into a plurality of sections by at least one grease filter which passes drainage after oils/fats decomposition. The grease filter is vertically disposed on the bottom of the grease trap so as to traverse the flow of the drainage.

The grease trap may be further divided into a plurality of subsections by at least one barrier vertically disposed on the grease trap so as to traverse the flow of the drainage. The height of the barrier is adjusted so that the drainage can flow over the barrier.

In addition, the impeller unit is equipped with a reversible motor for reversing the rotation of the impellers.

Instead of the impeller unit, the decomposition method can employ a sprinkler unit installed in the grease trap for continuously sprinkling water onto the drainage surface and likewise activating aerobic microorganisms. The methods using a sprinkler unit include the following variations.

(i) A method using a sprinkler unit comprising an underwater pump disposed in the drainage, a water pipe vertically extending from the underwater pump above the surface of the drainage, and a fountain top disposed at the top end of the drainpipe, the drainage being pumped up through the water pipe by the underwater pump and sprinkled onto the surface of the drainage from the fountain top.

(ii) A method using a sprinkler unit comprising a sprinkler and a motor each fixed on a lid which covers the top opening of the grease trap, a water pipe extending from the motor into the drainage as driven by the motor, and an underwater pump disposed at the bottom end of the water pipe, the drainage being pumped up through the water pipe by the underwater pump and sprinkled onto the surface of the drainage from a head of the sprinkler.

(iii) A method using a sprinkler unit comprising a sprinkler pipe formed with a plurality of holes and arranged along one side wall of the grease trap in the direction of the flow of the drainage, a water pipe extending approximately from the middle of the sprinkler pipe into the drainage for supplying the drainage to the sprinkler pipe, and an underwater pump disposed at the bottom end of the water pipe, the drainage being pumped up through the water pipe by the underwater pump and sprinkled onto the surface of the drainage from the plurality of holes in the sprinkler pipe.

(iv) A method using a sprinkler unit comprising a pair of sprinkler pipes formed with a plurality of holes and arranged along both side walls of the grease trap in the direction of the flow of the drainage, a water pipe extending approximately from the middle of each sprinkler pipe and being bent in the drainage 90 degrees in the drainage inwardly of the grease trap before touching the bottom thereof, and an underwater pump disposed at the bottom end of the water pipe, the drainage being pumped up through each water pipe by the underwater pump and sprinkled onto the surface of the drainage from the plurality of holes in the sprinkler pipes.

(v) A method using any of the above sprinkler units, wherein the underwater pump has an intake designed to pump in the upper half of the drainage stored in the grease trap.

As have been described, the decomposition methods of the present invention are largely classified into two types: (a) the impeller-aided air-circulation method effected by the rotation of the impeller and applicable to relatively small grease traps, and (b) the sprinkler method using an underwater pump. The aeration in the methods of the present invention comprises supplying air directly onto the oils/fats-floating water surface, unlike the conventional manners of underwater air supply. Under the proper environment, aerobic microorganisms are activated to decompose edible oils and fats floating on the drainage surface into carbon, hydrogen, oxygen and the like, while taking in oxygen, and to release carbon dioxide ($CO_2$) and water ($H_2O$). Air is sufficiently replenished from the lid, drain inlet and drain exit of the grease trap.

Now, referring to the drawings, the grease trap, as the apparatus for carrying out the above method, is described in the following embodiments.

Figure 1:
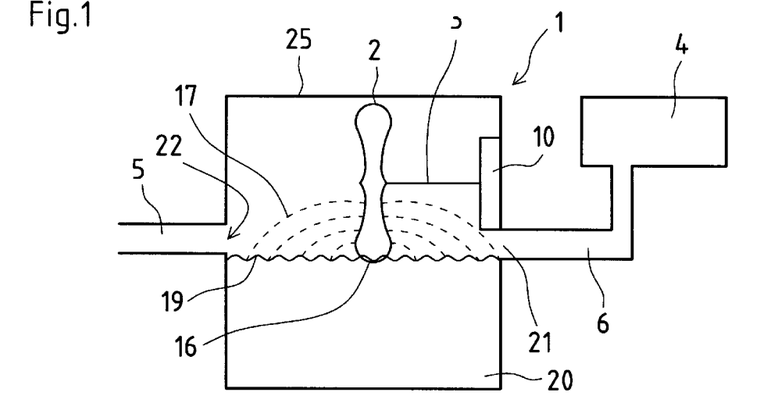
FIG. 1 is a schematic view showing the inside structure of a grease trap of the invention according to the first embodiment.

FIG. 1 is a schematic view showing the inside structure of a grease trap of the invention according to the first embodiment.

A grease trap 1 is composed of a tank 24 for storing drainage, a drain inlet 21 for introducing drainage drained from a kitchen 4 into the tank 24 through a drainpipe 6, a drain exit 22 for discharging the drainage into a sewer 5, and a lid 25 for covering the opening of the tank 24. Namely, drainage 20 is drained from the kitchen 4 through the drainpipe 6, stored in the tank 24 and finally discharged into the sewer 5. At the start of the decomposition treatment, aerobic microorganisms are supplied into the drainage 20 in the grease trap 1. Installed on one side wall of the tank 24 is an impeller unit comprising an impeller 2, an impeller-motor shaft 3 attached to the impeller 2 and extending horizontally with respect to the bottom surface of the tank 24, and an impeller motor 10 for rotating the impeller 2. The impeller unit is installed such that tips 16 of the impeller 2 can continuously stir and splash the predetermined depth of water on the surface 19 including the thickness of the floating oils and fats.

In the above grease trap, aerobic microorganisms are activated through continuous aeration by the rotation of the impeller 2. The activated aerobic microorganisms consume the edible oils and fats floating on the surface of the drainage 20, with taking in oxygen, and decompose it into carbon, hydrogen, oxygen and the like. Since air is replenished from the gap between the tank 24 and the lid 25, the drain inlet 21 and the drain exit 22, sufficient oxygen is supplied to keep the microorganisms activated.

Figure 2:
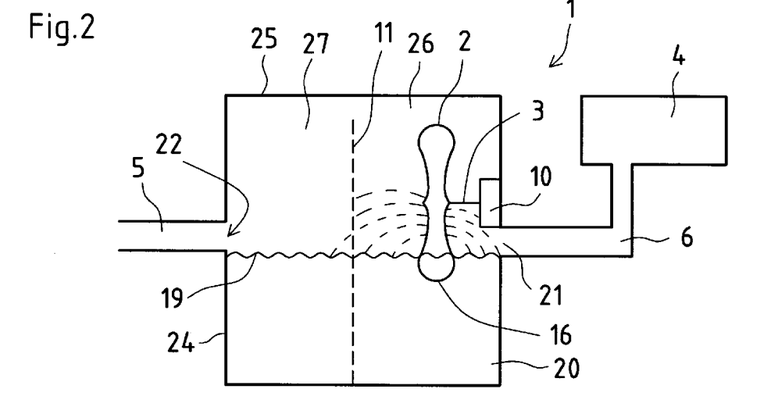
FIG. 2 is a schematic view showing the inside structure of a grease trap of the invention according to the second embodiment.

The first embodiment is advantageously applicable to relatively small grease traps. As a variation, the second embodiment is devised for larger grease traps. As shown in FIG. 2, the grease trap 1 of the second embodiment further includes a grease filter 11 vertically disposed on the bottom of the grease trap in the direction of traversing the flow of the drainage, so that the grease filter passes the drainage after oils/fats decomposition. Thus, the grease trap 1 is divided into a plurality of sections 26, 27. In the first section 26, the aerobic microorganisms are activated into decomposing oils and fats under continuous aeration. The drainage after oils/fats decomposition flows through the grease filter 11 into the second section 27 to be discharged into the sewer 5.

Figure 3:
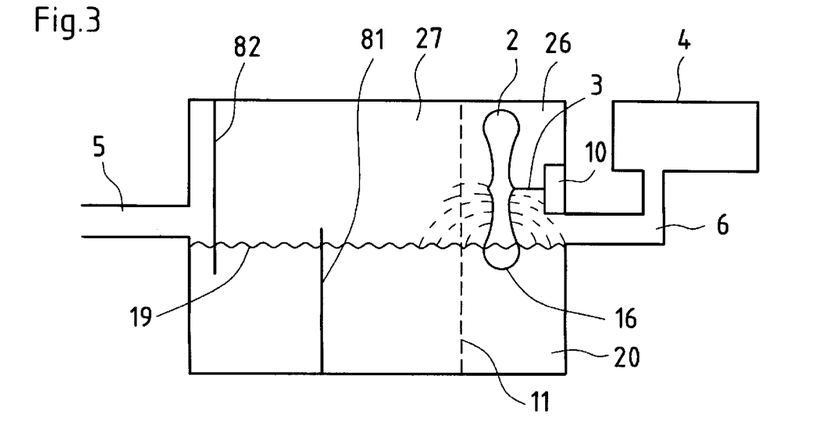
FIG. 3 is a schematic view showing the inside structure of a grease trap of the invention according to the third embodiment.

The third embodiment is intended for still larger grease traps. As shown in FIG. 3, two barriers 81, 82 are provided in the second section 27 divided by the grease filter 11. The barriers 81, 82 are vertically disposed on the grease trap in the direction of traversing the flow of the drainage, their height being designed so as to allow the drainage to overflow. These barriers 81, 82 divide the second section 27 into a plurality of subsections, wherein the drainage after oils/fats decomposition flows over the barriers 81, 82 and exits into the sewer 5.

The rotation of the impeller 2 may be unevenly loaded, when oil or fat is deposited on the impeller 2. In the above embodiments, a reversible motor is employed as the impeller motor 10 so as to disperse the deposited oil or fat by rotating the impeller 2 in the forward and reverse directions.

Figure 4:
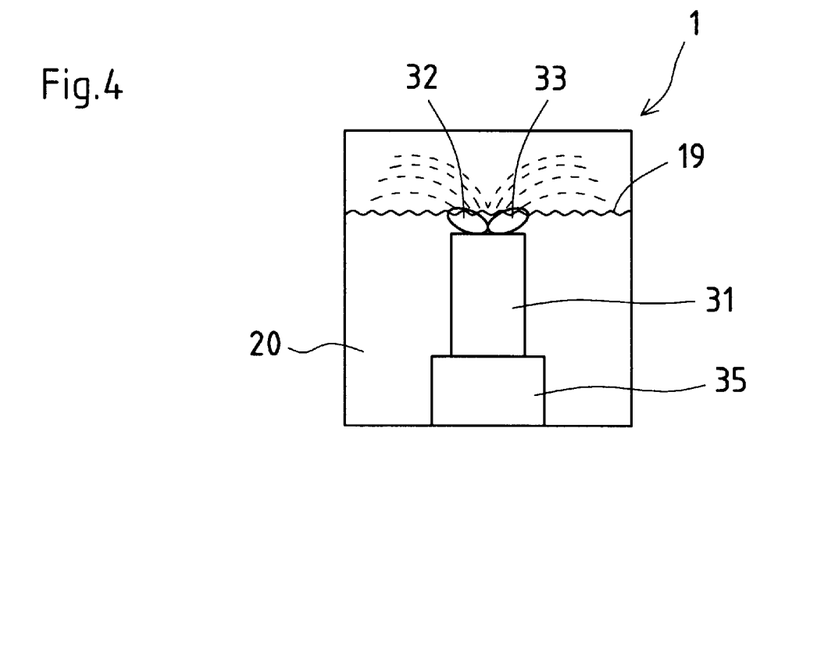
FIG. 4 is a schematic view showing the inside structure of a grease trap of the invention according to the fourth embodiment.
Figure 5:
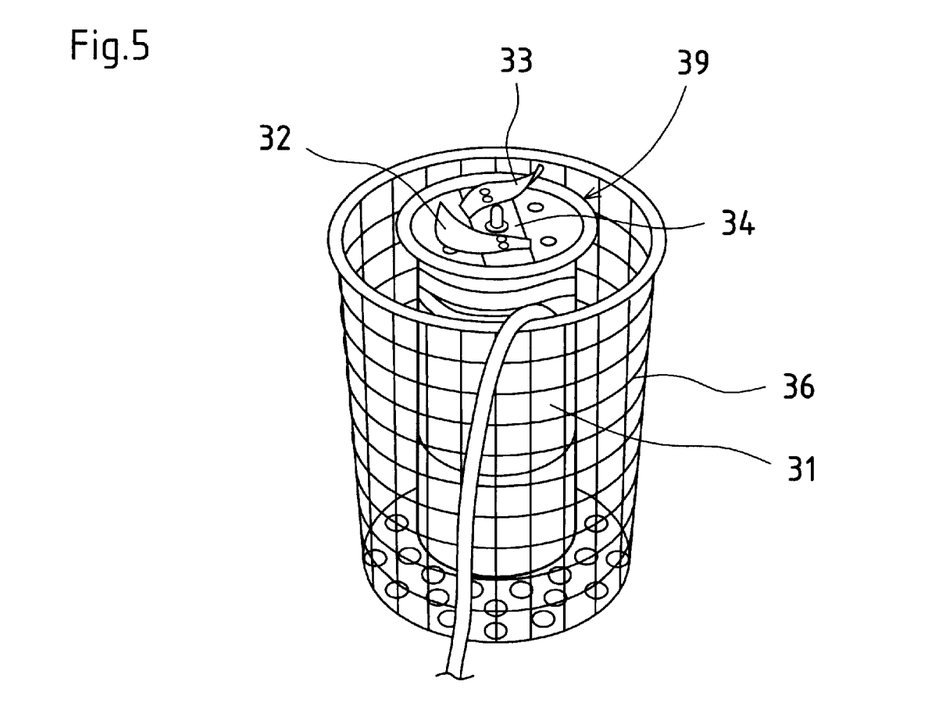
FIG. 5 is a schematic perspective view showing the impeller unit as used in the fourth embodiment.

In the above embodiments, the impeller unit is installed on the side wall of the tank, with orienting the impeller vertical to the water surface. Alternatively, the impeller may be oriented horizontal to the water surface. Referring to FIGS. 4 and 5, the latter arrangement is described as the fourth embodiment.

The impeller unit comprises a base 35 disposed on the bottom of the grease trap 1, an underwater motor 31 rested on the base 35, a vertical rotation shaft (not shown) vertically extending from the motor 31 and rotating as driven by the motor 31, and impellers 32, 33 mounted on an impeller mount 34 which is secured to and rotates with the vertical rotation shaft. The impeller mount 34 is shaped in an elongated rectangle, wherein its longitudinal centre portion is secured to the vertical rotation shaft and its longitudinal length does not exceed the diameter of the circular pan on the top of the motor 31. The impellers 32, 33 are fixed on the impeller mount 34 on both sides of its centre portion secured to the vertical rotation shaft. In the present embodiment, the impellers are arranged as close to the water surface as possible, practically 5 cm below the surface. This impeller position enables continuous stirring and splashing of the surface of the drainage 20 in the most favourable manner.

The impeller unit of the horizontal disposition splashes the drainage and ensures sufficient aeration, as mentioned in the former embodiments which employ the impeller unit of the vertical disposition. Accordingly, aerobic microorganisms supplied into the grease trap 1 are activated to decompose the floating oils and fats. In the meantime, the microorganisms continue to propagate, far from the danger of extinction.

In the actual operation of the fourth embodiment, it is preferable to accommodate the entire impeller unit 39 in a metal net basket 36, as shown in FIG. 5. The metal basket 36 not only simplifies the handling of the impeller unit 39 but also protects it from the deposition of food remains.

Figure 6:
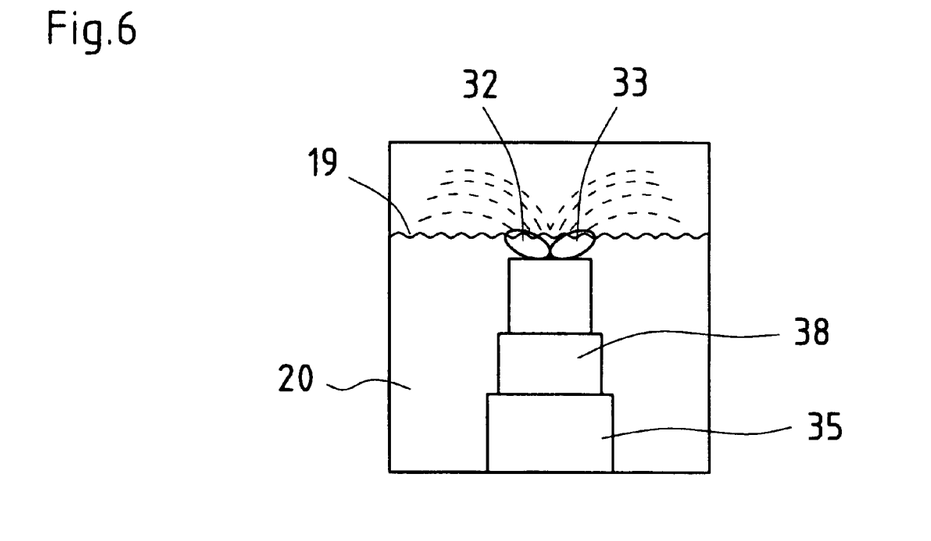
FIG. 6 is a schematic view showing the inside structure of a grease trap of the invention according to the fifth embodiment.

As a variation of the fourth embodiment, the fifth embodiment shown in FIG. 6 employs a vertically extendible, height-adjustable underwater motor 38 in lieu of the underwater motor 31.

The water level of drainage stored in the grease trap varies, as the size of the grease trap depends on the scale of the restaurant business. With the height-adjustable underwater motor 38, the impellers 32, 33 can be constantly positioned about 5 cm below the water surface, whatever the size of the grease trap. The height of the impeller can be adjusted advantageously in a telescopic manner, but any other manners may be adopted as well.

Figure 7:
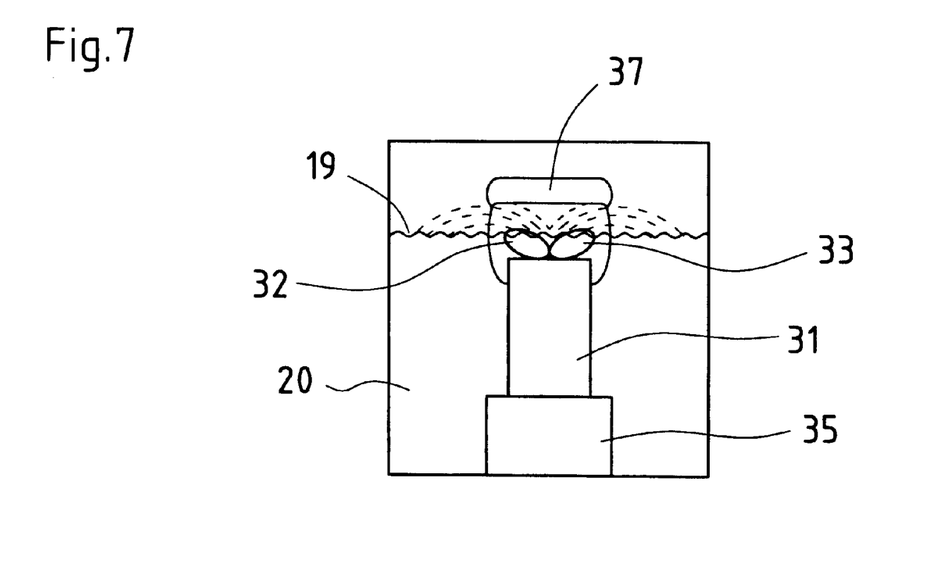
FIG. 7 is a schematic view showing the inside structure of a grease trap of the invention according to the sixth embodiment.

As a variation of the fourth and fifth embodiments, FIG. 7 illustrates the sixth embodiment of the invention which is highly effective for small grease traps.

The sixth embodiment is characterised in further comprising an umbrella-like shield 37 set up above the impeller unit 39, for the purpose of protecting the lid 25 from drainage splashed by the impellers 32, 33. The shield 37 catches splashed oils and fats and protects the lid 25 from the splashes, thus saving troublesome cleaning of the grease trap. The performance of the impeller unit is not adversely affected by the shield 37.

In the following embodiments, a sprinkler unit replaces the impeller unit for the activation of aerobic microorganisms. The sprinkler unit is applied to relatively large grease traps.

Figure 8:
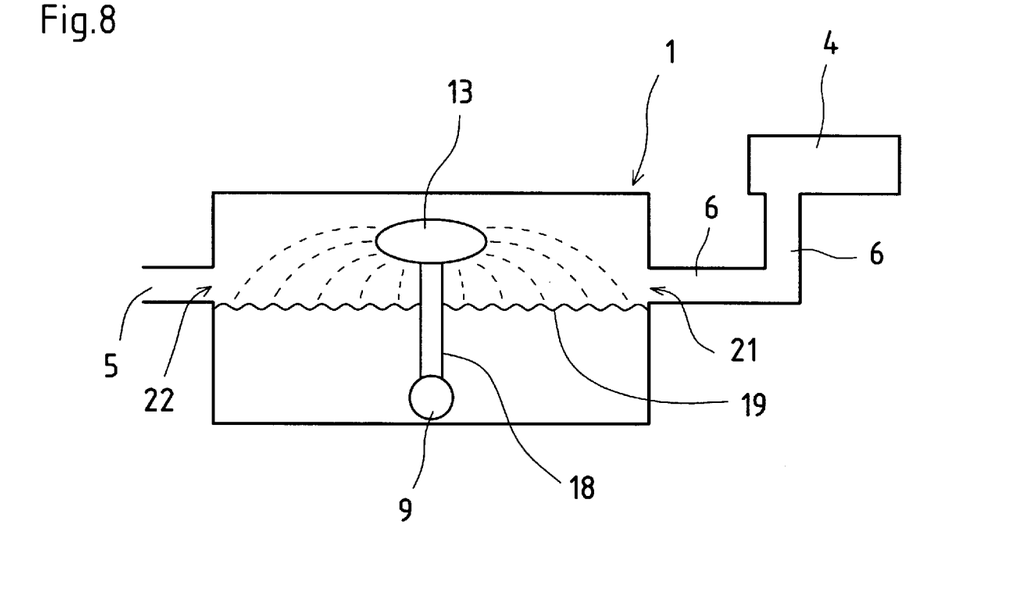
FIG. 8 is a schematic view showing the inside structure of a grease trap of the invention according to the seventh embodiment.

FIG. 8 is a schematic view showing the inside structure of the seventh embodiment.

The seventh embodiment is similar to the preceding embodiments in that the grease trap 1 includes the drain inlet 21 connected to the drainpipe 6 which extends from the kitchen 4, and the drain exit 22 connected to the sewer 5. The characteristic difference of the seventh embodiment lies in the use of a sprinkler unit as the decomposing unit for edible oils and fats. The sprinkler unit comprises a circulative underwater pump 9, a water pipe 18 for upwardly drawing the drainage pumped in by the underwater pump 9, and a fountain top 13 for sprinkling the drainage. According to this sprinkler unit, drainage is showered from the fountain top 13 onto the water surface 19. The shower aerates the water surface and activates aerobic microorganisms supplied into the grease trap 1.

Figure 9:
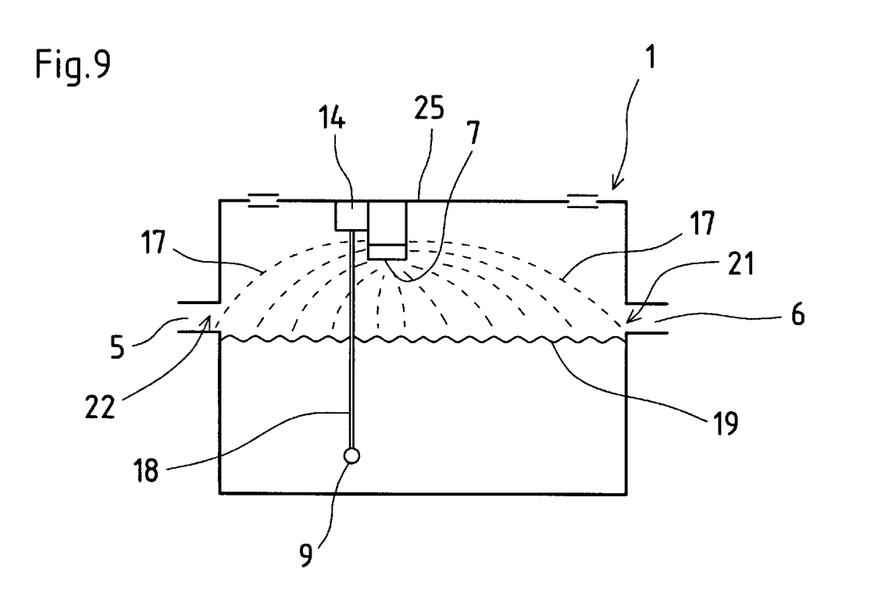
FIG. 9 is a schematic view showing the inside structure of a grease trap of the invention according to the eighth embodiment.
Figure 10:
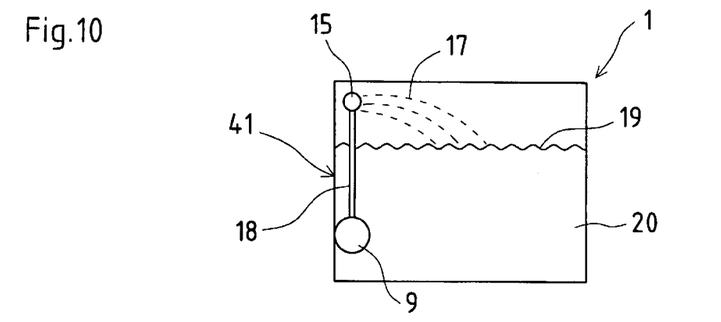
FIG. 10 is a schematic view showing the inside structure of a grease trap of the invention according to the ninth embodiment.
Figure 11:
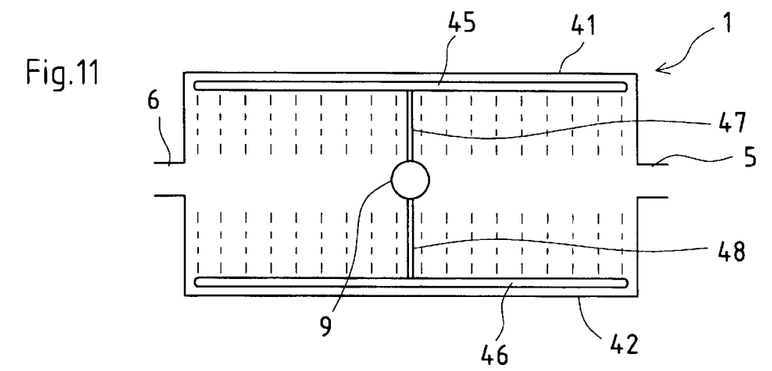
FIG. 11 is a plan view showing the inside structure of a grease trap of the invention according to the tenth embodiment.
Figure 12:
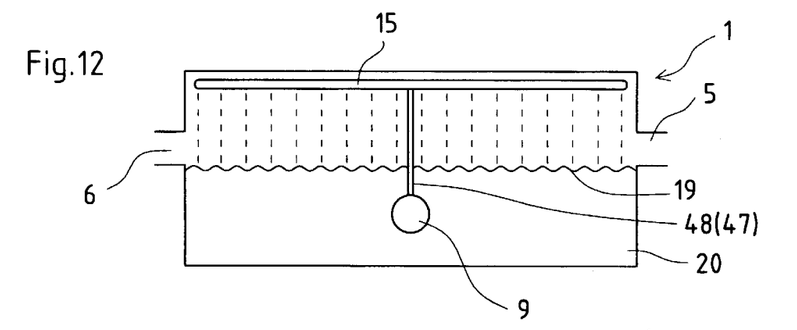
FIG. 12 is a front view showing the inside structure of a grease trap of the invention according to the tenth embodiment.
Figure 13:
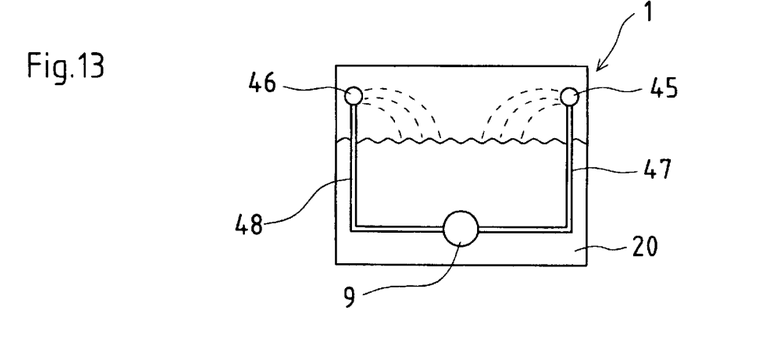
FIG. 13 is a side view showing the inside structure of a grease trap of the invention according to the tenth embodiment.

The embodiments utilising the sprinkler unit include the eighth embodiment (FIG. 9), the ninth embodiment (FIG. 10) and the tenth embodiment (FIGS. 11–13). FIG. 9 is a side view of the inside structure of the grease trap of the eighth embodiment. FIG. 10 is a side view of the inside structure of the grease trap in which a sprinkler pipe is provided on one side of the grease trap. FIG. 11 is a plan view showing the inside structure of the grease trap in which sprinkler pipes are provided on both sides of the grease trap. FIG. 12 and FIG. 13 are a front view and a side view, respectively, of the tenth embodiment. Each embodiment is hereinafter described with reference to the corresponding drawings.

The sprinkler unit of the eighth embodiment comprises a sprinkler 7 and a motor 14 each fixed on the lid 25, a water pipe 18 extending from the motor 14 into the drainage, and an underwater pump 9 disposed at the bottom end of the water pipe 18. Except for the location of the motor and the sprinkler means, this embodiment shows the action and effect similar to the seventh embodiment. The pumped drainage is showered from the sprinkler 7 onto the water surface 19, and the shower aerates the water surface to activate aerobic microorganisms.

In the sprinkler unit of the ninth embodiment, a sprinkler pipe 15 formed with a plurality of holes is arranged along a side wall 41 in the direction of the drainage flow. The water pipe 18 extends approximately from the middle of the sprinkler pipe 15 downwardly into the drainage 20. The circulative underwater pump 9 is disposed at the bottom end of the water pipe 18. According to this sprinkler unit, drainage is pumped up through the water pipe 18 by the pump 9 and sprinkled from the plural holes in the sprinkler pipe 15 onto the water surface.

In the sprinkler unit of the tenth embodiment, sprinkler pipes 45, 46 formed with a plurality of holes are arranged along side walls 41, 42 of the grease trap 1, as compared to the ninth embodiment which disposes the sprinkler pipe 15 along one side wall 41 only. The sprinkler pipes 45, 46 are linked to the underwater pump 9 via water pipes 47, 48, each downwardly extending approximately from the middle of the sprinkler pipes 45, 46 and being bent in the drainage 90 degrees inwardly of the grease trap 1 before reaching the bottom thereof. The drainage pumped up by the underwater pump 9 is sprinkled from the plural holes in the sprinkler pipes 45, 46 onto the water surface. As this sprinkler unit is capable of sprinkling water from both sides of the grease trap 1, its aeration effect is greater than that of the ninth embodiment which disposes a sprinkler pipe along one side wall only.

Figure 14:
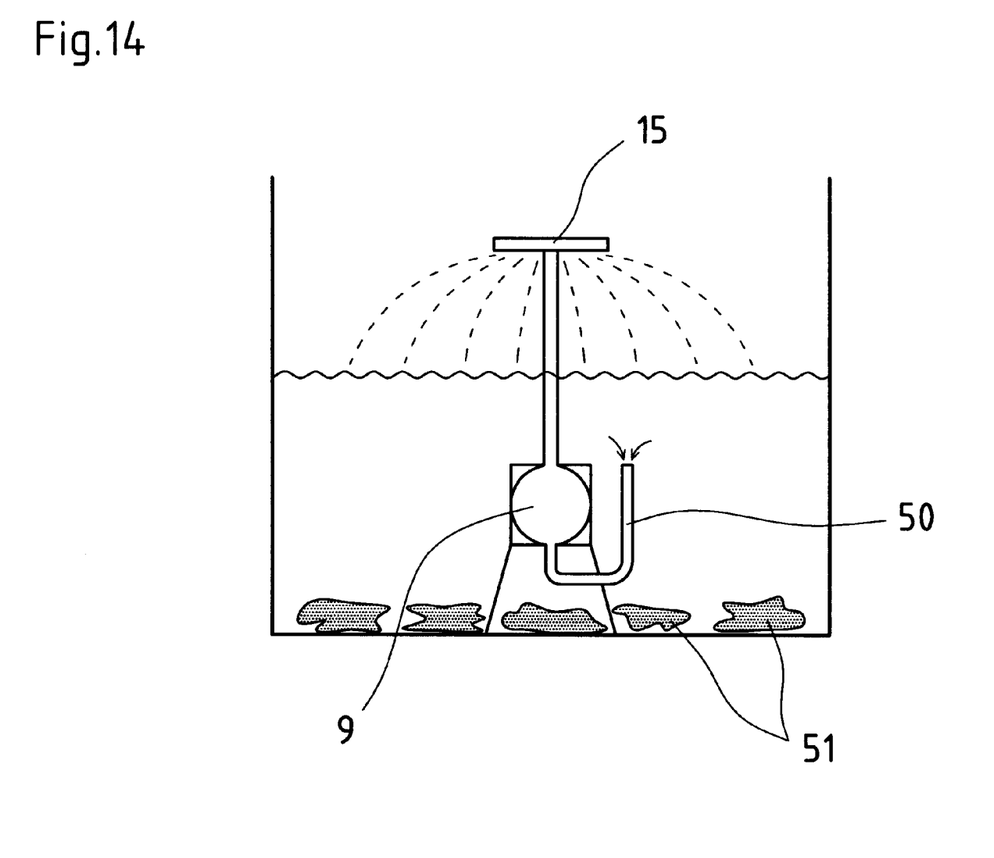
FIG. 14 is an explanatory view showing the intake of an underwater pump as used in the seventh to tenth embodiments.

In the above embodiments using the sprinkler unit, the intake of the underwater pump 9 is composed of a U-shaped pipe 50 as shown in FIG. 14. According to this arrangement, the pump 9 pumps in the upper half of the drainage stored in the grease trap (as shown by arrows), without stirring sludge 51. The sprinkler means sprinkles relatively clean water which is not contaminated by the sludge 51 accumulated on the bottom of the grease trap.

Incidentally, the impeller unit or sprinkler unit disposed in the grease trap and the electric systems including the electric wiring are subjected to a water-proof treatment.

What is claimed is:

1. A grease trap for storing drainage including a reservoir structure that traps grease contained in drainage from a kitchen and that has a drain inlet for introducing drainage from a kitchen through a drainpipe and a drain exit for discharging the drainage to a sewer, which accommodates a sprinkler unit for continuously sprinkling the drainage onto a surface of the drainage.

2. A grease trap as claimed in claim 1, wherein the sprinkler unit comprises an underwater pump disposed in the drainage, a water pipe vertically extending from the underwater pump above the surface of the drainage, and a fountain top disposed at the top end of the drainpipe, the drainage being pumped up through the water pipe by the underwater pump and sprinkled onto the surface of the drainage from the fountain top.

3. A grease trap as claimed in claim 1, wherein the grease trap is provided with a lid for covering a top opening of the grease trap, and the sprinkler unit comprises a sprinkler and a motor each fixed on the lid, a water pipe extending from the motor into the drainage as driven by the motor, and an underwater pump disposed at the bottom end of the water pipe, the drainage being pumped up through the water pipe by the underwater pump and sprinkled onto the surface of the drainage from a head of the sprinkler.

4. A grease trap as claimed in claim 1, wherein the sprinkler unit comprises a sprinkler pipe formed with a plurality of holes and arranged along one side wall of the grease trap in the direction of a flow of the drainage, a water pipe extending approximately from the middle of the sprinkler pipe into the drainage for supplying the drainage to the sprinkler pipe, and an underwater pump disposed at the bottom end of the water pipe, the drainage being pumped up through the water pipe by the underwater pump and sprinkled onto the surface of the drainage from the plurality of holes in the sprinkler pipe.

5. A grease trap as claimed in claim 1, wherein the sprinkler unit comprises a pair of sprinkler pipes formed with a plurality of holes and arranged along both side walls of the grease trap in the direction of a flow of the drainage, a water pipe extending approximately from the middle of each sprinkler pipe and being bent in the drainage 90 degrees inwardly of the grease trap before touching the bottom thereof, and an underwater pump disposed at the bottom end of the water pipe, the drainage being pumped up through each water pipe by the underwater pump and sprinkled onto the surface of the drainage from the plurality of holes in the sprinkler pipes.

6. A grease trap as claimed in any of claims 1 to 5, wherein the underwater pump has an intake designed to pump in the upper half of the drainage stored in the grease trap.

7. A grease trap as claimed in claim 1, wherein an electric wiring and a plurality of electric systems for driving the sprinkler unit in the grease trap are subjected to a water-proof treatment.

8. A method of decomposing edible oils and fats while oils- or fats-containing drainage from a kitchen is stored in the grease trap of claim 1, which comprises the steps of supplying aerobic microorganisms capable of decomposing the edible oils and fats into the drainage, and continuously sprinkling the drainage onto a surface of the drainage by means of a sprinkler unit installed in the grease trap, thereby activating the aerobic microorganisms.

9. A method of decomposing edible oils and fats as claimed in claim 8, wherein the sprinkler unit comprises an underwater pump disposed in the drainage, a water pipe vertically extending from the underwater pump above the surface of the drainage, and a fountain top disposed at the top end of the drainpipe, the drainage being pumped up through the water pipe by the underwater pump and sprinkled onto the surface of the drainage from the fountain top.

10. A method of decomposing edible oils and fats as claimed in claim 8, wherein the grease trap is provided with a lid for covering a top opening of the grease trap, and the sprinkler unit comprises a sprinkler and a motor each fixed on the lid, a water pipe extending from the motor into the drainage as driven by the motor, and an underwater pump disposed at the bottom end of the water pipe, the drainage being pumped up through the water pipe by the underwater pump and sprinkled onto the surface of the drainage from a head of the sprinkler.

11. A method of decomposing edible oils and fats as claimed in claim 8, wherein the sprinkler unit comprises a sprinkler pipe formed with a plurality of holes and arranged along one side wall of the grease trap in the direction of a flow of the drainage, a water pipe extending approximately from the middle of the sprinkler pipe into the drainage for supplying the drainage to the sprinkler pipe, and an underwater pump disposed at the bottom end of the water pipe, the drainage being pumped up through the water pipe by the underwater pump and sprinkled onto the surface of the drainage from the plurality of holes in the sprinkler pipe.

12. A method of decomposing edible oils and fats as claimed in claim 8, wherein the sprinkler unit comprises a pair of sprinkler pipes formed with a plurality of holes and arranged along both side walls of the grease trap in the direction of a flow of the drainage, a water pipe extending approximately from the middle of each sprinkler pipe and being bent in the drainage 90 degrees inwardly of the grease trap before touching the bottom thereof, and an underwater pump disposed at the bottom end of the water pipe, the drainage being pumped up through each water pipe by the underwater pump and sprinkled onto the surface of the drainage from the plurality of holes in the sprinkler pipes.

13. A grease trap as claimed in any of claims 8 to 12, wherein the underwater pump has an intake designed to pump in the upper half of the drainage stored in the grease trap.

14. A method of decomposing edible oils and fats as claimed in claim 8, wherein an electric wiring and a plurality of electric systems for driving the sprinkler unit in the grease trap are subjected to a water-proof treatment.

\* \* \* \* \*